Sept. 12, 1939.  J. MORKOSKI  2,172,983
IMPLEMENT LIFTING MECHANISM
Filed Feb. 24, 1938  4 Sheets-Sheet 4

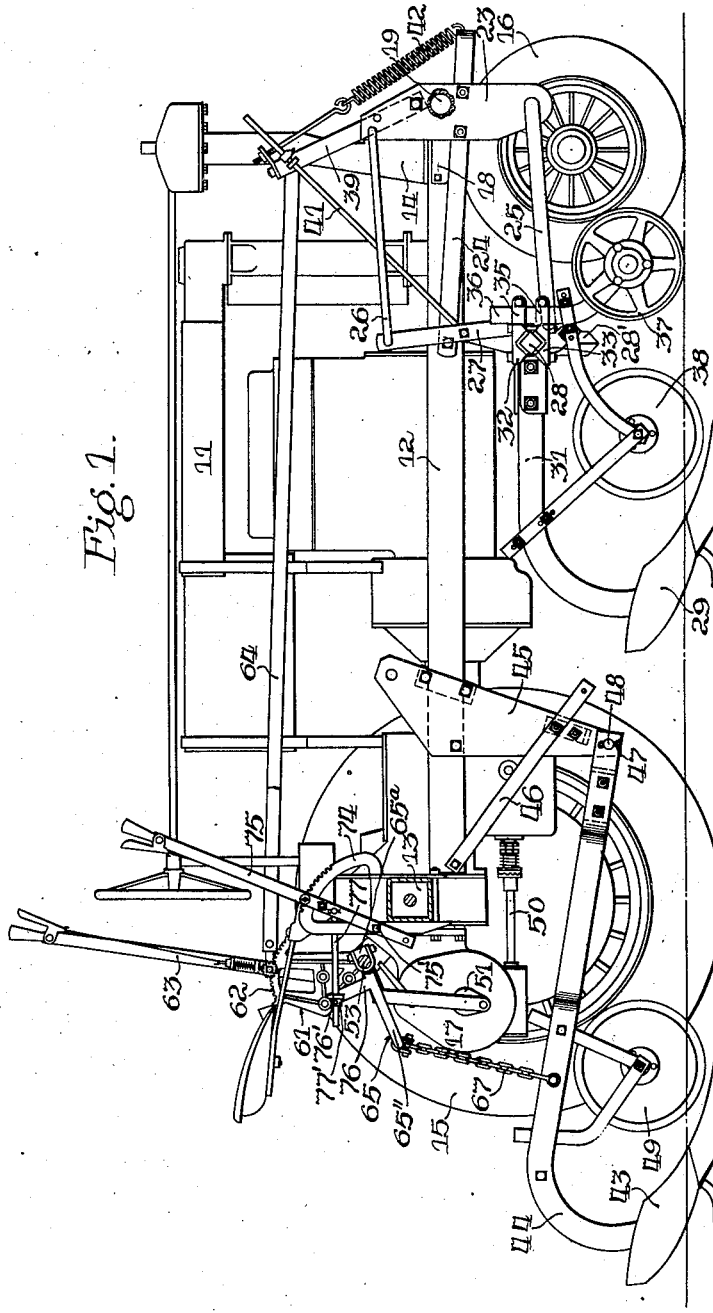

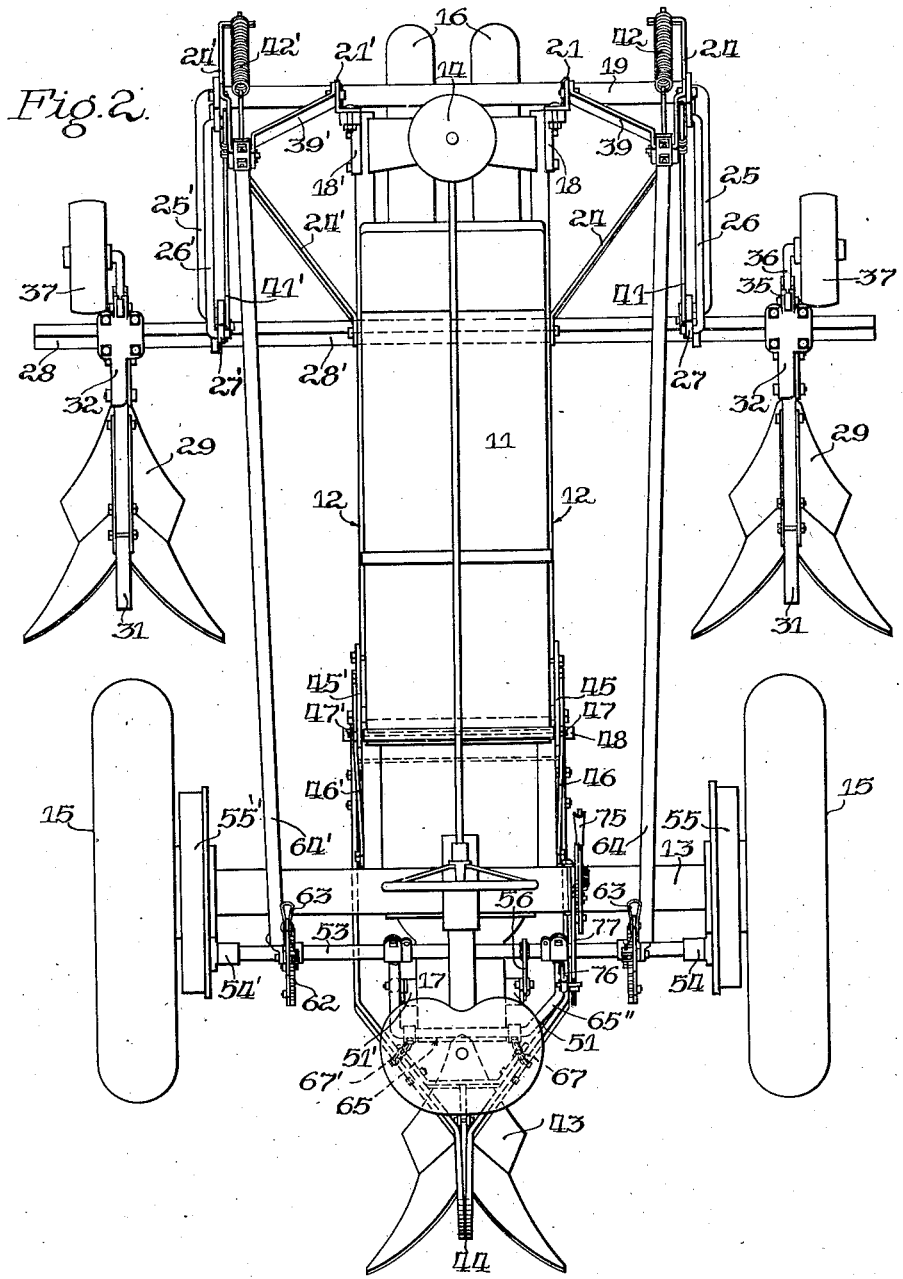

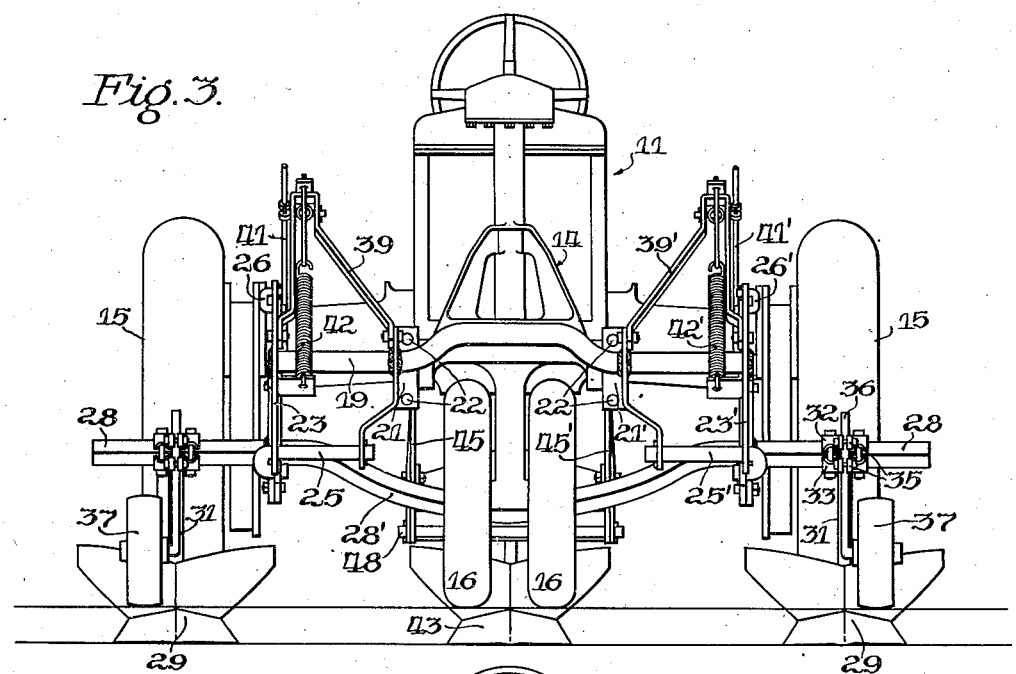
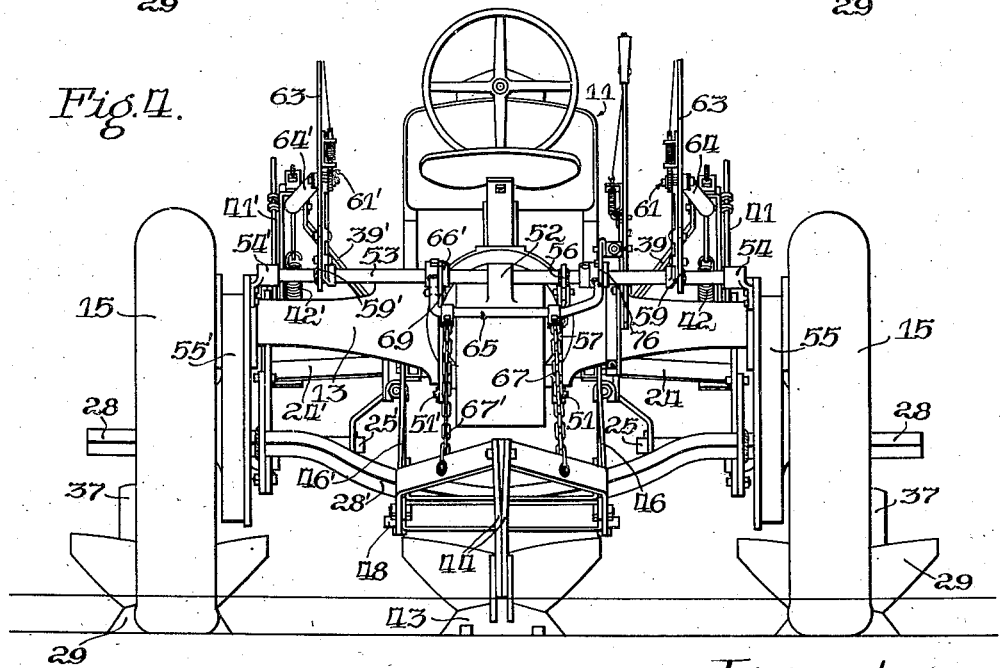

Inventor.
James Morkoski.
By V. F. Lasagne
Att'y.

Patented Sept. 12, 1939

2,172,983

UNITED STATES PATENT OFFICE 2,172,983

IMPLEMENT LIFTING MECHANISM

James Morkoski, Canton, Ill., assignor to International Harvester Company, a corporation of New Jersey Application February 24, 1938, Serial No. 192,207

11 Claims. (Cl. 97—50)

This invention relates to farm implements of the type adapted to be directly connected to and actually carried by a tractor. More specifically, the invention relates to an arrangement of the power lifting means on the tractor for vertically adjusting the implement to and from a ground engaging position.

The principal object of the invention is to provide a more simple and improved arrangement of power lifting means used on tractors for the purpose of adjusting the front and rear implements on the same, either simultaneously or selectively, as desired.

Another object of the invention is to provide an arrangement which may be readily adapted for either a single power lift device or a double power lift device, whichever device the farmer may happen to have on his tractor.

Another object of the invention is to provide an arrangement which has manual adjusting means for independently and separately regulating the working depth of each of the respective implements.

In general, the invention resides in the use of but a single supporting rock-shaft or rockable member conveniently located at the rear of the tractor and a lifting arm means, or rear lifting bail, which is adjustably mounted on the rock-shaft, front and rear implements respectively connected to the separate members, and power actuated means operative to rock the rockable members for the adjustment of the implements on the tractor. In the connection of the power actuated means with the second rockable member, a lost motion means is provided to allow for adjustment or relative movement of this member on the rock-shaft member in a direction for the purpose of regulating the depth of engagement of the implement with the ground. A manual adjusting mechanism is used for this purpose, which is so associated with the second member as to adjust the same, but to be inoperable during the adjustment of implements by the power actuated means.

For other objects and a clearer understanding of the invention, reference may be had to the following description taken in connection with the accompanying drawings, in which:

Figure 1 is a side elevational view of a tractor with a rear wheel removed and showing front and rear implements attached to the same for vertical adjustment thereon;

Figure 2 is a plan view showing the arrangement of the implements on the tractor adapted for three row lister plowing;

Figure 3 is a front elevational view of the tractor and implements;

Figure 4 is a rear elevational view of the tractor and connected implements;

Figure 5:
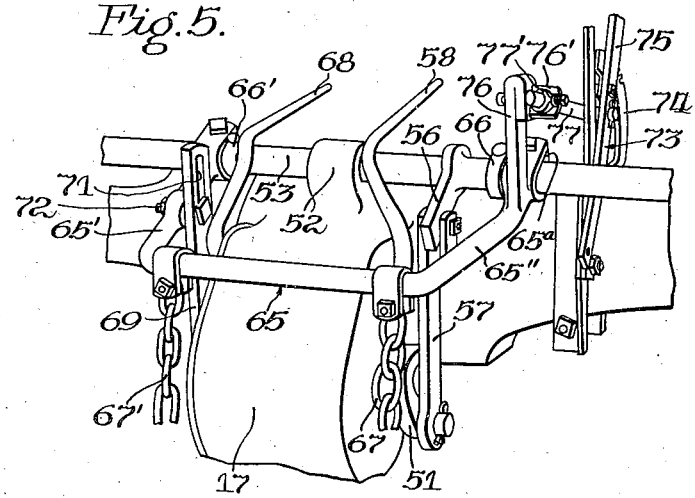
Figure 6:
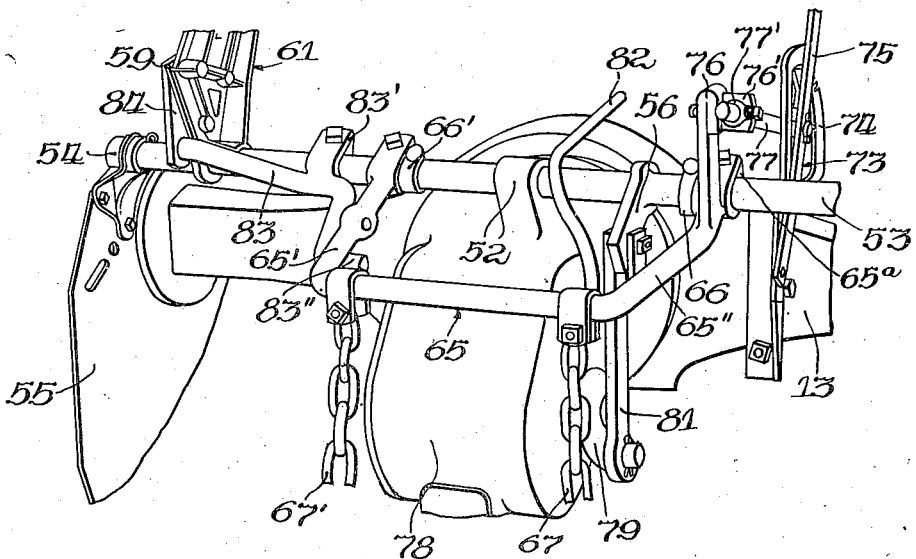

Figure 5 is a perspective view of the present arrangement when used with a power lift device having two independently operable arms to give selective operation of the front and rear connected implements; and, Figure 6 is a perspective view similar to that shown in Figure 5 of the present arrangement when used with a power lift device having but a single operable arm to give simultaneous operation of the front and rear connected implements.

In the drawings, there is shown generally a tractor 11 of the general purpose or row crop type having side sills 12, a rear axle housing 13, a forward steering mechanism 14, rear wheels 15, and forward wheels 16. Attached to the rear axle housing 13 is a power lift device 17 drivingly connected thereto.

The mounting of the forward implements will first be described. Of the forward ends of the side sills 12 there are attaching brackets 18 and 18', normally a part of the general purpose tractor. These brackets are adapted to support the front end implement carrying structure, which comprises a cross pipe 19 having bracket irons 21 and 21' adapted to be readily connected to the sill brackets 18 and 18', respectively, by bolts 22. The outer ends of the pipe 19 have welded thereto vertically extending bracket plates 23 and 23'. For bracing the cross pipe 19, brace members 24 and 24' connect the bracket plates 23 and 23' respectively, with the side sills 12 of the tractor. The connection of these brace members and of the bracket irons to the tractor is about the only connection of the front structure which has to be made upon mounting the same upon the forward end of the tractor. The bracket irons 21 and 21' each have downwardly extending portions, which are adapted to pivotally support respectively the ends of right and left crank members 25 and 25', which are also supported in the transversely aligned, downwardly extending portions of the bracket plates 23 and 23'. These two projections serve to support the individual cranks forwardly. The cranks extend rearwardly to form lower parallel lift arms. Pivotally connected to the upper end of the bracket plates 23 and 23' are upper parallel lift arms 26 and 26' connected respectively to the same. The rear ends of the lower and upper parallel lift arms are connected respectively to vertically extending members 27 and 27' located in rear of the steering wheels 16, to which is connected a transverse tool or implement bar 28. This tool bar is preferably of square cross section and extends underneath the tractor as snugly as possible and is curved along its portion 28' in order to give sufficient height for the mounting of lister plow elements 29 at its outer ends. From the description thus far, it should be seen that this bar is pivotally connected to the pipe structure 19 so that parallel lift movement of the transverse bar is obtained. The ends of the transverse bar extend beyond the parallel lift rigging to leave unencumbered extensions for easy mounting of other implements in lieu of lister plows, such as cultivator shovels or a disk working tool.

Each plow structure 29 comprises a plow beam 31 which has normally attached thereto, prior to mounting of the beam on the transverse bar 28, one of two clamping plates 32 and 33. When one of the plates is in engagement with the transverse bar, the other plate may be placed over the bar and the two plates clamped together by bolt means, so that the implement structure is now rigidly carried by the transverse bar. The forward ends of these clamping plates may carry a clamp means 35 for the insertion of a gauge wheel post 36 having a gauge wheel 37 thereon. A coulter wheel 38 may be mounted on the implement structure in any manner.

The lifting structure for this transverse bar comprises inverted U-shaped lifting arms 39 and 39' pivotally connected at their low ends to the bracket irons 21 and 21' and to the bracket plates 23 and 23', respectively. These lifting arms are adapted to swing in a forward and aft direction. The lifting of the transverse bar and its implements is accomplished through lifting links 41 and 41' connected at their lower ends to the vertically extending members 27 and 27', respectively, and to their respective lifting arms 39 and 39'. To assist in the raising movement of the implements, there are provided springs 42 and 42' interconnecting the upper ends of the lifting arms 39 and 39', respectively, and ends of the brace members 24 and 24'.

Mounted on the rear of the tractor is a third lister plow structure 43, which is also adapted for vertical adjustment on the tractor. With third lister plow, it should now be seen that the tractor implement will plow three rows at a time, the rear plow being located between the two plows on the front transverse bar 28 to plow the middle furrow.

The rear plow structure comprises a bifurcated plow beam 44 of some length, which is pivotally connected at its forward ends to downwardly depending plate members 45 and 45', which in turn are rigidly connected to the tractor sills 12. Brace means 46 and 46', respectively, serve to brace the lower ends on the plates 45 and 45'. The ends of the plow beam 44 may be easily detached from the plates 45 and 45' by removal of cotter pins 47 and 47' in a shaft 48 transversely spacing the lower ends of the plates 45 and 45'. The plow beam 44 has a coulter wheel 49 mounted thereon. It should now be seen that all three of the implements above described are mounted on the tractor for vertical movement.

The power lift means for vertically adjusting the implements and embodying the principal features of the present invention will now be described. The power lift shown in Figures 1, 2, 4 and 5 is a double power lift of the type shown and described in the Patent 1,911,373 to A. C. Lindgren et al., wherein the connection with the power take-off of the tractor is made to the under portion of the power lift device through a drive connection 50. Projecting from the power lift device or housing 17 are two independently operable crank arms 51 and 51', one at each side of the same. The power lift device is adapted to fit on the rear axle housing 13 of the tractor and has on its top a bearing 52, by which a transverse rock-shaft or rockable member 53 may be centrally supported. The ends of the rock-shaft 53 are journaled in cup bearings 54 and 54' carried by the drop axle housings 55 and 55', respectively, of the rear axle housing 13. The rock-shaft 53 has a lever arm 56, which is adapted to have a pitman 57 operatively connected thereto, which is, in turn, connected to the crank arm 51, on the right side of the power lift, as shown in Figure 5. Rotation of the crank will thus cause oscillation of the rock-shaft 53, and is effected at the will of the operator by moving the power lift control handle 58.

To effect a connection between the rock-shaft 53 and the front implement structure there are provided two lever arms 59 and 59' weldingly secured to the rock-shaft, one at each end of the rock-shaft at the sides of the tractor, each of which having bolted thereto manual depth-adjusting mechanisms 61 and 61', respectively, and each of which comprising a quadrant 62 and an adjusting lever 63 pivotally attached thereto. The adjusting levers are connected with their respective lifting arms 39 and 39' on each side of the tractor by means of lifting pipe 64 and 64'. Each adjusting lever is adjustable about its quadrant whereby the front implements 29 may be raised or lowered to regulate their working or plowing depth. A forward movement of the levers 63 decreases the plowing depth, while a rearward movement increases the plowing depth of the lister plows. It should be seen that, once the adjustment has been made, the transverse bar 28 and its associated implements 29 will be adjusted vertically on the tractor when the power lift device is operated; that is, when the operating handle 58 is actuated to cause operation of the crank arm 51' on the right side of the power lift device. The rock-shaft and lifting pipe connections with the front implements thus far described are more or less standard on general purpose tractors, or are, at least, accessories which can be quickly attached to the same.

The lifting of the rear implement on the tractor is now to be described. Instead of a second rock-shaft on the tractor with a lifting arm extending rearwardly, the lifting arm means or second member in the present instance is pivotally mounted or journaled directly to the already mounted rock-shaft 53. The lifting arm means in the present instance takes the form of a lifting bail 65 which has left and right leg portions 65' and 65" adapted to be easily attached to the rock-shaft 53 and mounted thereon for angular adjustment thereabout. For this purpose the forward ends of the leg portions are bifurcated to receive the shaft and are held thereon by a cooperating block element 65a and bolt means. To keep the bail from moving laterally on the rock-shaft, there are provided two collar members 66 and 66'. The lifting bail is connected to the bifurcated plow beam 44 of the rear implement structure by means of chains 67 and 67' extending rearwardly sufficiently to give a direct lifting action to the implement. This lifting bail is pivoted on the rock-shaft 53 for adjustment by means of the second crank 75 arm 51 on the left side of the double power lift 17 and is placed in operation by an operator's handle 68. A lost motion connection is made with the crank arm 51 through a pitman 69 having a lost motion slot 71 for sliding connection with a projected bolt means 72 on the left leg portion 65' of the lifting bail. By operation of the pitman 69 the lower end of the slot 71 engages with the bolt means 72 to lift the lifting bail 65 and the rear implement 43 attached thereto. The lost motion connection above mentioned allows for depth adjustment of the rear implement.

On the right side of the rear axle housing, there is mounted a depth adjusting mechanism 73 for regulating the working or plowing depth of the rear implement, which comprises a quadrant 74 and adjusting lever 75 pivoted at 75' thereon. The right leg portion 65" of the bail 65 has an upwardly projected arm portion 76 having a swivel member 76', which, in turn, connects with the adjusting lever 75 by means of a link 77, the link being slidably fitted in the swivel 76' and adapted to lift the lifting bail when an adjustable collar 77' engages the face of the swivel. Movement of the adjusting lever 75 will thus cause adjustable rotation of the lifting bail about the rock-shaft 53, with the bolt means 72 moving in the slot 71 of the pitman 69, to effect a regulation of the plowing depth of the rear implement. Movement of the adjustment lever forwardly decreases the plowing depth, while movement rearwardly permits lowering of the rear implement and increases the plowing depth. This arrangement of the sliding link connection 77 leaves the lever 75 free from swinging movement during adjustment of the implement by the power device. It should now be seen that there has been provided an organization of parts wherein separate depth adjustment or regulation of the front and rear implements may be obtained as well as separate and independent vertical adjustment of the implements.

In cases where the farmer does not happen to have a double power lift for his tractor, with only a single power lift, the arrangement may be readily adapted for operation by a single power lift. In Figure 6, there is shown a similar arrangement of the rock-shaft assembly of the present invention adapted for a single power lifting device. The arrangement is similar in that the rear lifting bail is journaled on the rock-shaft and also in that independent depth adjustment of the forward and rear implement structures may be obtained. The structure does differ, however, in that both implements are raised and lowered simultaneously.

Referring to Figure 6, there is shown a single power lift 78 mounted on the rear axle housing 13 of a type also shown in the above mentioned Patent 1,911,373 to Lindgren et al. The single power lift has but a single crank arm 79, which is connected through a pitman 81 to the regular lever arm 56 to rock the rock-shaft 53. Operation of the power lift device is effected at the will of the operator by movement of the operating handle 82 to rock the rock-shaft 53. Journaled on the rock-shaft 53 is the regular lifting bail 65 to which the rear implement is connected. Power for lifting the lifting bail is obtained from the rock-shaft 53 by a lifting arm 83 adapted to be readily attached to or detached from the rock-shaft. The arm 83 is retained on the shaft 53 by bolting together the bifurcated portions 83' and given torque through a rigidly secured plate piece 84, that is fixed to the arm 59 in the rock-shaft 53 by the same bolt means that holds the quadrant mechanism 61 fixed thereto. The lift 83 has an arm portion 83" that engages underneath the left leg portion 65' of the lifting bail 65 and raises the same at the same time the front implements are raised. By merely engaging the underneath portion of the lifting bail 65, the bail is left free for adjustment in an upward direction, or, in other words, has lost motion whereby a depth adjustment of the rear implement may be made. The quadrant depth adjusting mechanisms are similarly located as explained above in conjunction with the double power lift, and independent adjustment may be made of the front and rear implements.

It should now be apparent from the foregoing that there has been provided a simple arrangement of a power means adapted for separate or simultaneous operation of front and rear implements on the tractor by either a double or single power lift device, and wherein there is available independent depth adjustment or regulation for the respective implements.

It should be understood that various changes may be made in the details of construction of the above described invention, but that such changes shall be deemed to be made without departing from the spirit and scope of the invention as defined in the appended claims.

What is claimed as new is:

1. In combination, a tractor, front and rear implements mounted for vertical movement thereon, a rockable member, the front implement operatively connected to the rockable member to be moved thereby, a lifting means mounted for adjustment on said rockable member, the rear implement operatively connected to the same to be moved thereby, mechanism for adjusting the lifting means on the first member to regulate the working depth of the rear implement, and power actuated means operative to rock said member and lifting means.

2. In combination, a tractor, front and rear implements mounted for vertical movement thereon, a rock-shaft, the front implement operatively connected to the same to be moved thereby, a lifting bail mounted for adjustment on said rock-shaft, the rear implement operatively connected to the same to be moved thereby, manual means for adjusting the lifting bail on the rock-shaft to regulate the working depth of the rear implement, and power actuated means operative to rock the rock-shaft and lifting bail.

3. In combination, a tractor, front and rear implements mounted for vertical movement thereon, a rock-shaft, means for connecting the front implement with the rock-shaft to be moved thereby including a manual adjusting means to regulate the working depth of the front implement, a lifting arm mounted for rockable adjustment on said rock-shaft, the rear implement being connected to said lifting arm, manual adjusting means for adjusting the lifting arm on the rock-shaft to regulate the working depth of the rear implement, and power actuated means operative to rock said rock-shaft and lifting arm.

4. In combination, a tractor, implements mounted for vertical movement thereon, a power lift device having two output connections adapted to be operated independently of each other, a rockable member connected to one of the power lift connections, one of said implements operatively connected to the rockable member to be moved thereby, lifting means mounted for adjustment on said rockable member, a lost motion means for connecting said lifting means to the other power lift connection, another implement operatively connected to the lifting means to be moved thereby, and means for adjusting said lifting means through the lost motion means to regulate the working depth of said last mentioned implement whereby said implements may be separately operated by the power device and the second implement may be adjustable independently of the other implement.

5. In combination, a tractor, implements mounted for vertical movement thereon, a power lift device having two output connections adapted to be operated independently of each other, a rockable member connected to one of the power lift connections, means for connecting the rockable member with one of said implements having an adjustable mechanism associated therewith to regulate the working depth of the implement, a second member mounted for adjustment on the rockable member, a lost motion means for connecting the second member to the other power lift connection, another implement operatively connected to the second member to be moved thereby, and means for adjusting the second member through the lost motion means to regulate the working depth of the last mentioned implement whereby said implements may be separately lifted and adjusted.

6. In combination, a tractor, front and rear implements mounted for vertical movement thereon, a power lift device having two output connections adapted to be operated independently of each other, a rock-shaft operatively connected with one of the power lift connections, means for connecting the rock-shaft with the front implement, a lifting bail journaled to the rock-shaft, the rear implement being operatively connected to the lifting bail to be moved thereby, a lost motion means for connecting the lifting bail with the other power lift connection, and means for adjusting the lifting bail about the rock-shaft through the lost motion means to regulate the working depth of the rear implement whereby the front and rear implements may be separately operated by the power device and the rear implement may be adjustable independently of the front implement.

7. In combination, a tractor, front and rear implements mounted for vertical movement thereon, a power lift device having two output connections adapted to be operated independently of each other, a rock-shaft operatively connected with one of the power lift connections, means for connecting the first implement with the rock-shaft, means associated with the connecting means to regulate the working depth of the front implement, a lifting bail journaled to the rock-shaft, the rear implement operatively connected to the lifting bail to be moved thereby, lost motion means for connecting the lifting bail with the other power lift connection, and means for adjusting the lifting bail on the rock-shaft through the lost motion means to regulate the working depth of the rear implement whereby said implements may be separately lifted and adjusted.

8. In combination, a tractor, implements mounted for vertical movement thereon, a rockable member, one of the implements operatively connected therewith to be moved thereby, lifting means mounted for adjustment on the rockable member, another implement operatively connected to the lifting means to be moved thereby, a lifting arm connected to the rockable member and adapted to engage the under portion of the lifting means, means for adjusting the lifting means relative to the rockable member and its lifting arm to regulate the working depth of the last-mentioned implement, and power actuated means operative to rock said rock-shaft.

9. In combination, a tractor, front and rear implements mounted for vertical movement thereon, a rock-shaft, means connecting the front implement with the rock-shaft, a lifting bail journaled to the rock-shaft, means for connecting the rear implement with the lifting bail, means for adjusting the lifting bail about the rock-shaft to regulate the working depth of the rear implement, a separable lifting arm adapted to be connected to the rock-shaft and engaging the under portion of the lifting bail, and power actuated means operative to rock the rock-shaft and lift the implements.

10. In combination, a tractor, front and rear implements mounted for vertical movement thereon, a rockable member, the front implement being operatively connected to the rockable member to be moved thereby, lifting means mounted for adjustment on the rockable member, the rear implement being operatively connected to the lifting means to be moved thereby, depth adjusting mechanism carried by the tractor for regulating the working depth of the rear implement, lost motion means connecting the adjusting mechanism with the lifting means, and power actuated means to rock said member and lifting means.

11. In combination, a tractor, an implement mounted for vertical movement at the front of the tractor, a rock-shaft mounted at the rear of the tractor and connected with the front implement to move the same, a power lift device connected to the tractor to be operated thereby and to the rock-shaft to rock the same, an implement mounted for vertical movement at the rear of the tractor, a separable lifting means adapted to be easily attached to the rock-shaft for adjustment with respect thereto and connected to the rear implement to move the same, means for making the adjustment of the lifting means to regulate the working depth of the rear implement, and a separable lifting arm adapted to be easily attached to the rock-shaft to rock therewith and adapted to engage an under portion of the lifting means upon operation of the power lift device.

JAMES MORKOSKI.